(12) United States Patent
Boer et al.

(10) Patent No.: US 7,757,501 B2
(45) Date of Patent: Jul. 20, 2010

(54) METHOD FOR CONTROLLING A REFRIGERATOR APPLIANCE

(75) Inventors: Alessandro Boer, Cassinetta Di Biandronno (IT); Raffaele Paganini, Varlse (IT)

(73) Assignee: Whirlpool Corporation, Benton Harbor, MI (US)

(*) Notice: Subject to any disclaimer, the term of this patent is extended or adjusted under 35 U.S.C. 154(b) by 502 days.

(21) Appl. No.: 11/577,448

(22) PCT Filed: Oct. 10, 2005

(86) PCT No.: PCT/EP2005/055135

§ 371 (c)(1), (2), (4) Date: Nov. 29, 2007

(87) PCT Pub. No.: WO2006/045695

PCT Pub. Date: May 4, 2006

(65) Prior Publication Data

US 2008/0195256 A1 Aug. 14, 2008

(30) Foreign Application Priority Data

Oct. 22, 2004 (EP) .................................. 04105255

(51) Int. Cl.
G05D 23/32 (2006.01)
(52) U.S. Cl. ............................ 62/157; 62/187; 62/408
(58) Field of Classification Search .................. 62/187, 62/157, 180, 408; 236/1 C
See application file for complete search history.

(56) References Cited

U.S. PATENT DOCUMENTS

| | | | |
|---|---|---|---|
| 4,510,767 A | 4/1985 | Komatsu et al. | |
| 5,024,265 A | 6/1991 | Buchholz et al. | |
| 5,377,498 A * | 1/1995 | Cur et al. | 62/187 |
| 5,732,561 A * | 3/1998 | Kim | 62/89 |
| 5,899,083 A * | 5/1999 | Peterson et al. | 62/186 |
| 5,983,654 A * | 11/1999 | Yamamoto et al. | 62/187 |
| 6,053,002 A * | 4/2000 | Matsumoto et al. | 62/230 |
| 6,125,641 A * | 10/2000 | Kim et al. | 62/187 |
| 6,176,097 B1 * | 1/2001 | Kim | 62/187 |
| 6,250,092 B1 | 6/2001 | Lanz et al. | |
| 6,301,910 B1 * | 10/2001 | Noritake et al. | 62/187 |
| 6,668,568 B2 * | 12/2003 | Holmes et al. | 62/187 |
| 6,694,754 B1 | 2/2004 | Schenk et al. | |
| 6,769,265 B1 * | 8/2004 | Davis et al. | 62/228.4 |
| 6,959,559 B2 * | 11/2005 | Nam et al. | 62/187 |
| 7,100,387 B2 * | 9/2006 | Boer et al. | 62/228.5 |
| 2004/0103674 A1* | 6/2004 | Boer et al. | 62/157 |

(Continued)

FOREIGN PATENT DOCUMENTS

EP 0036238 9/1981

(Continued)

*Primary Examiner*—George Nguyen
(74) *Attorney, Agent, or Firm*—Kirk W. Goodwin; McGarry Bair P.C.

(57) ABSTRACT

A method for controlling a refrigerator having at least two compartments and actuators adapted to maintain temperatures of said compartments close to predetermined set values comprises a comparison between a signal (CCR) indicative of the cooling request of each compartment and a signal variable according to a predetermined carrier function. This comparison is carried out in a predetermined time interval (TW), said actuators being activated or deactivated on the basis of such comparison that is repeated for each subsequent time interval (TW).

16 Claims, 13 Drawing Sheets

U.S. PATENT DOCUMENTS

| | | | |
|---|---|---|---|
| 2004/0188935 A1* | 9/2004 | Nam et al. | 273/255 |
| 2008/0195256 A1* | 8/2008 | Boer et al. | 700/300 |
| 2008/0221740 A1* | 9/2008 | Boer et al. | 700/300 |

FOREIGN PATENT DOCUMENTS

| | | | |
|---|---|---|---|
| JP | 5189651 | | 7/1993 |
| JP | 05240551 A | * | 9/1993 |
| JP | 2000146403 | | 5/2000 |
| JP | 2001093040 | | 4/2001 |

* cited by examiner

METHOD FOR CONTROLLING A REFRIGERATOR APPLIANCE

CROSS-REFERENCE TO RELATED APPLICATIONS

This application claims priority on International Application No. PCT/EP2005/055135, filed Oct. 10, 2005, which claims priority on European Application No. EP 04105255.6, filed Oct. 22, 2004.

The present invention relates to a method for controlling a refrigerator having at least two compartments and actuators adapted to maintain the temperatures of said compartments close to predetermined set values.

Multi-compartments domestic refrigerators are well known in the art. One example is the so called no-frost double door refrigerator or the side by side refrigerator having both two different preservation compartments each closed by its own door, one compartment, namely the freezer compartment, being designed for preservation at a low average temperature of −18° C. or below, and the other compartment, known as the fresh food compartment, being designed for preservation at a higher temperature relatively close to 0° C., for example around 4° C. In these refrigerators, of the forced air circulation type, the above-mentioned actuators are the compressor, the evaporator fan and the damper. The control circuit of the refrigerator has to adjust the functions of these actuators (on/off status of the compressor or speed thereof in case of variable speed compressor, on/off status of the fan motor, open/closed status of the damper interposed in the air conduit between the freezer and the fresh food compartment) in order to maintain the temperature in such compartments closed to the desired values set by the user.

There are other kinds of multi-compartment domestic refrigerators in which the temperatures in each compartment may have smaller difference if compared to the above-mentioned kind of refrigerators. One of these refrigerators is disclosed in WO 03/042613 where the cabinet is divided into several compartments by thermally insulated shelves. In this kind of refrigerators the user can, within a unique cabinet designed for fresh food conservation, set different temperature values for each type of food placed on each shelf, with obvious advantages in term of food shelf-life since the right conservation temperature can be set for each kind of food.

Independently on the type of multi-compartment refrigerator, from the control point of view the main criticality of the known control systems is related to the fact that all the compartments compete with their own cooling request in the use of the unique cooling power source, this latter being usually a refrigerator circuit comprising a compressor and an evaporator.

In order to maximize the energy efficiency of the above known systems, the applicant has discovered that it's crucial to have a good synchronization between the cooling power source and each actuator with respect to the cooling request of each compartment. The known control algorithms are not focused on the synchronization with consequent inefficient performances.

The main object of the present invention is to provide a method for maximizing the energy efficiency in controlling the temperatures of a multi-compartment refrigerator where each compartment is cooled by a common single cooling power system (compressor+evaporator+condenser). Such cooling power system is connected with an appropriated cooled air distribution system. Such cooled air distribution system has the purpose of supplying the cooling power (cold air) from the cooling power system to each compartment. The delivering of cooled air to each compartment can be enabled or disabled through the correspondent compartment actuator, namely a damper and/or a fan.

The above object is attained through a method according to the appended claims, which guarantees the synchronization of the compartment cooling process in a multi-compartment appliance in order to maximize the energy efficiency in the refrigerator.

The technical result of the method according to the invention is quite surprising in terms of increase of energy efficiency, with a decrease of energy consumption of the order of 20%.

According to the invention, the control system performs a comparison between a signal indicative of the cooling request of each compartment, for instance the error signal between the actual temperature value and the set temperature value, and a signal variable according to a predetermined function, and such comparison is made in a predetermined time interval and is repeated again for each subsequent time interval. Depending on the result of such comparison (i.e. if the cooling request signal is higher or lower than the predetermined variable signal), the control system activates or deactivates the common actuator (for instance the compressor and the evaporator fan) and/or each single actuator (for instance a damper) associated with each compartment.

Preferably the predetermined function used for generating a variable signal is a linear carrier wave function so that it has its maximum value (or minimum value) at the beginning of the time interval (i.e. 100%) and the minimum value (or maximum value) at the end of the time interval (i.e. 0%).

Preferably the duration of the time interval can be automatically adjusted by the control system depending on the overall size of the refrigerator and/or on the refrigerator load, with the aim of keeping the temperature fluctuations in each single compartment within a predetermined minimum range.

The invention will be more apparent from the detailed description given hereinafter by way of example, with reference to the drawings in which.

Figure 1:
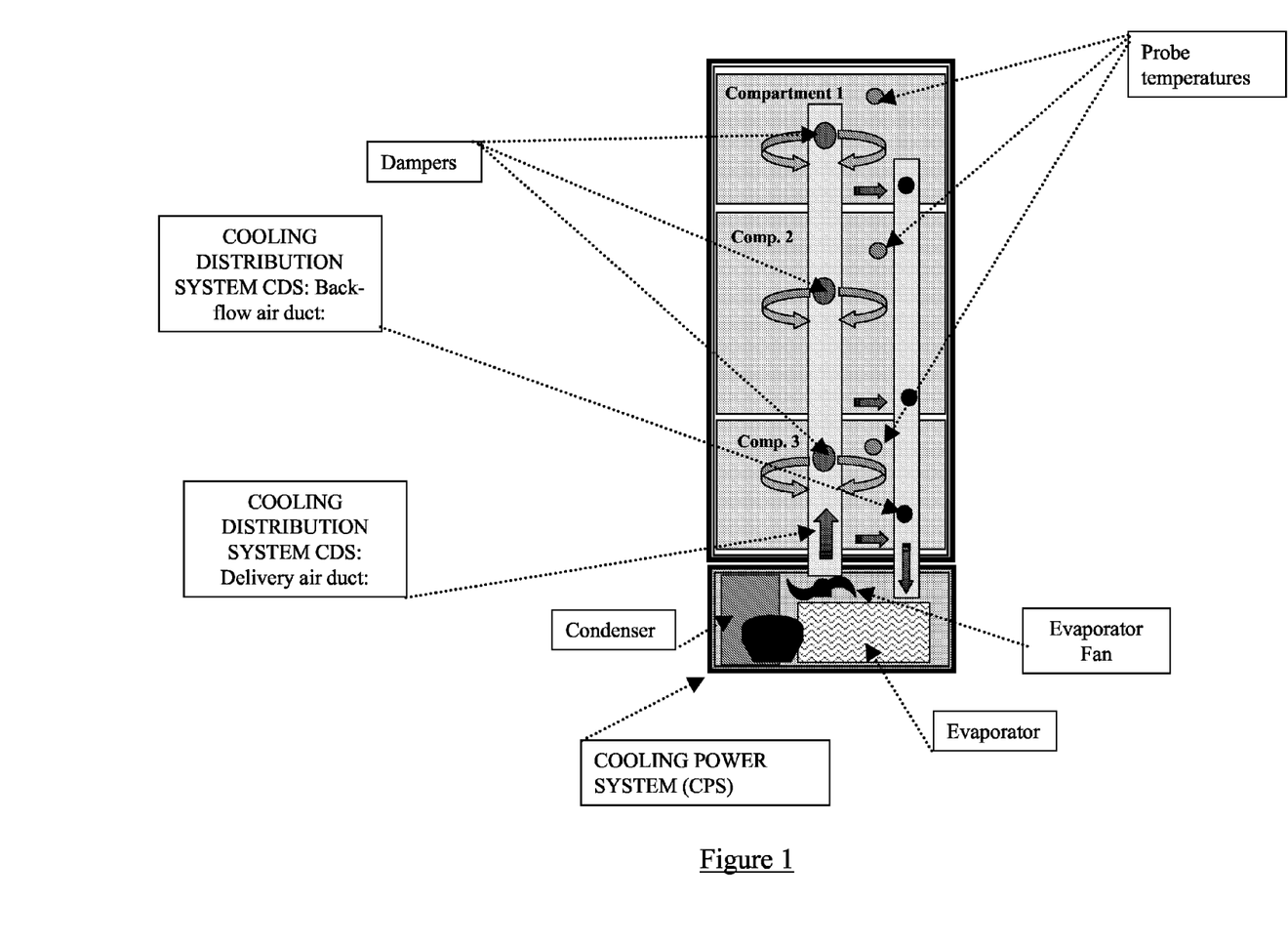
FIG. 1 is a schematic example of a multi-compartment refrigerator in which the control method according to the invention can be implemented.

A practical implementation of a multi-compartment appliance is described in FIG. 1. In this particular implementation, the cooling power system block CPS is composed of a compressor, an evaporator and a condenser, all placed in a plinth-shaped unit at the base of the refrigerator. The cooling distribution system CDS is composed of two air ducts: the delivery air duct and the back-flow air duct. The compartment actuators CA consist of dampers that open or close the flow of the cold air inside the correspondent compartment. The generic compartment can be cooled by switching on the compressor, the evaporator fan and by opening (switching on) the correspondent damper in order to feed cold air in the compartment.

Figure 2:
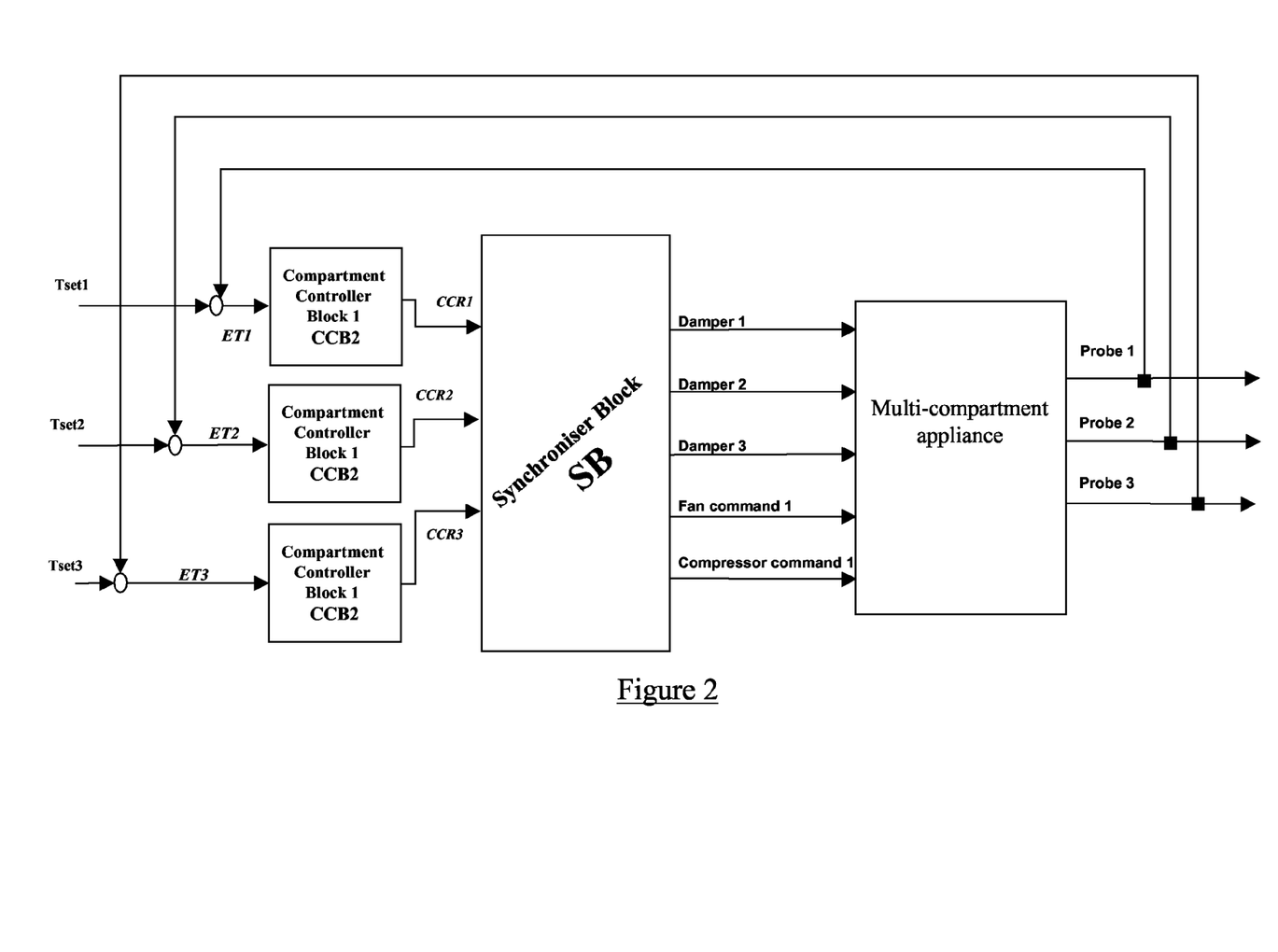
FIG. 2 is a block diagram representation of a control algorithm according to the invention, associated to a multi-compartment refrigerator.

With reference to FIG. 2 the multi-compartment refrigerator is shown as an input/output block. The first three inputs represent the commands to the three dampers. In the described example the dampers are of the on/off type. This means that the dampers can be set completely open or completely closed. The forth and the fifth inputs represent the commands for the status of the fan (on/off) and for the status of the compressor (on/off), assuming that the compressor is not of the variable speed type.

FIG. 2 shows also a block diagram representation of the control algorithm according to the present invention, connected to the appliance system. The control is composed of "n" compartment controller blocks CCBi, one for each compartment. Each CCB block receives input consisting of the temperature "error" ET of each compartment. Such information is representative on how the actual temperature of the compartment is far from the correspondent user set temperature. Each CCB block processes the temperature error signal ET and converts this signal into a compartment cooling request CCR. The CCB blocks can consist in a controller designed according with the traditional control theory (i.e. PID—Proportional-derivative-integral) or can be based on the application of advanced computational intelligence techniques such as fuzzy logic. A synchronizer block SB that provides the synchronization of the actuators (compressor, fan and dampers) processes the CCR signal coming from each compartment.

Figure 3:
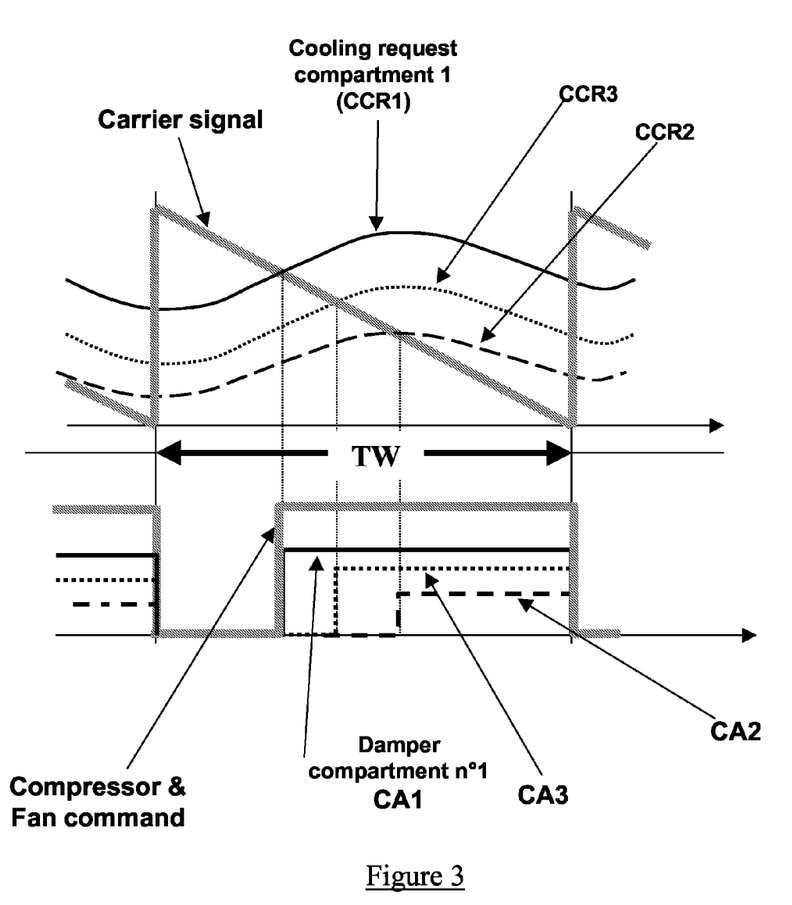
FIG. 3 is a diagram showing the time interval in a case of "off-synchronization" control type.

According to the present invention, a possible way to obtain the synchronization is described in FIG. 3. The main idea is based on the concept of time interval or time window TW. Such time window TW has a predetermined value adopted during the design phase. During each time window TW the controller (supervisor) updates the carrier signal so that it has its maximum value at the beginning of the time interval TW (i.e. 100%) and the minimum value at the end of the TW (i.e. 0%). As the output of the generic compartment controller block CCB (i.e. the generic CCR signal), also normalized between 0% and 100% to have common scale range with the carrier wave, exceeds the current value of the carrier, the synchronizer block SB will command the opening of the correspondent damper. The compressor and the evaporator fan will be switched on together with the first damper command. Once each actuator is switched on, this is hold ON until the end of the current time window WT unless an extra under cooling condition occurs (i.e. the probe temperature of the correspondent compartment is under a predetermined threshold).

Figure 4:
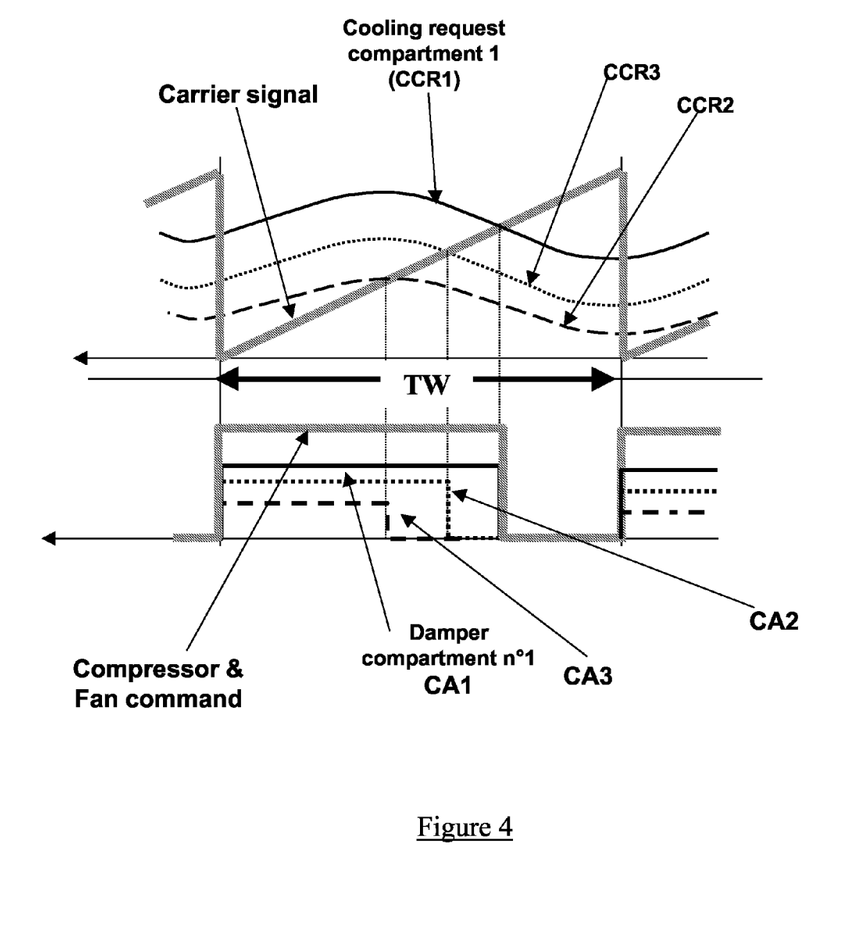
FIG. 4 is a diagram showing the time interval in a case of "on-synchronization" control type.

Another way to obtain the synchronization of the actuators is described in FIG. 4 (on-synchronization). In this case the synchronization is obtained by switching on all the actuators (compressor, fan/fans and dampers) at the beginning of each time window TW and, during the time window TW, each compartment actuator CA (damper) will be switched off (closed) according to the correspondent cooling request signal CCR. In general, the first damper that will be closed will be the damper of the coldest compartment (coldest with respect to the correspondent Tset). The last damper that will be closed will be the damper of the warmest compartment. When the last damper is closed, also the fan and the compressor are switched off simultaneously. According to the off-synchronization technique of FIG. 3, each compartment actuator is switched ON separately and the synchronization is obtained at the end of the time window TW, when all the actuators are switched off (off-synchronization). According with the on-synchronization technique of FIG. 4, each compartment actuator is switched off separately and the synchronization is obtained at the beginning of the time window TW, when all the actuators are switched on (on-synchronization).

Figure 5:
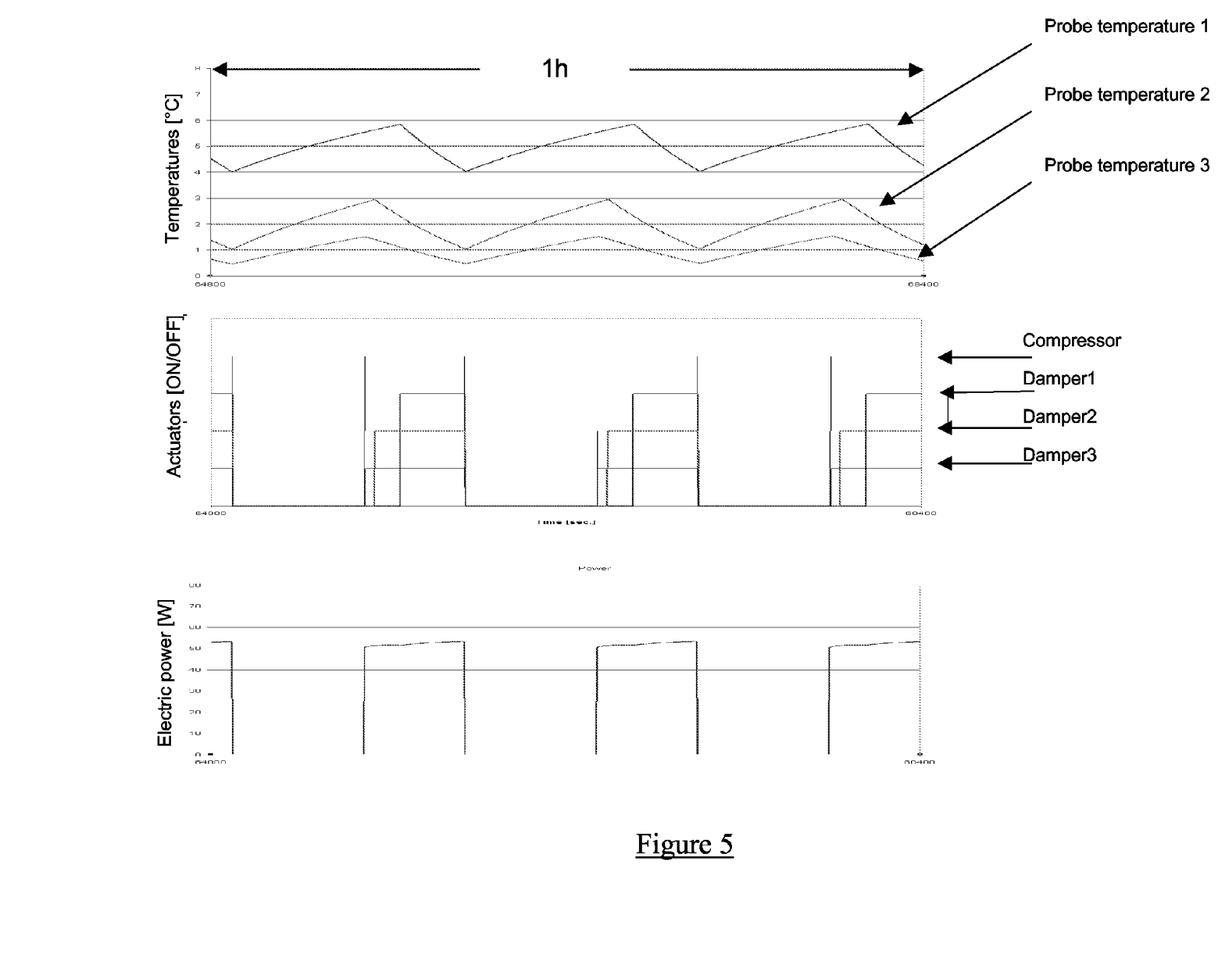
FIG. 5 shows three diagrams showing the results (temperatures, status of the actuators and electrical power) when the method according to the present invention is carried out in the refrigerator as shown in FIG. 1 with the control type of FIG. 3.
Figure 6:
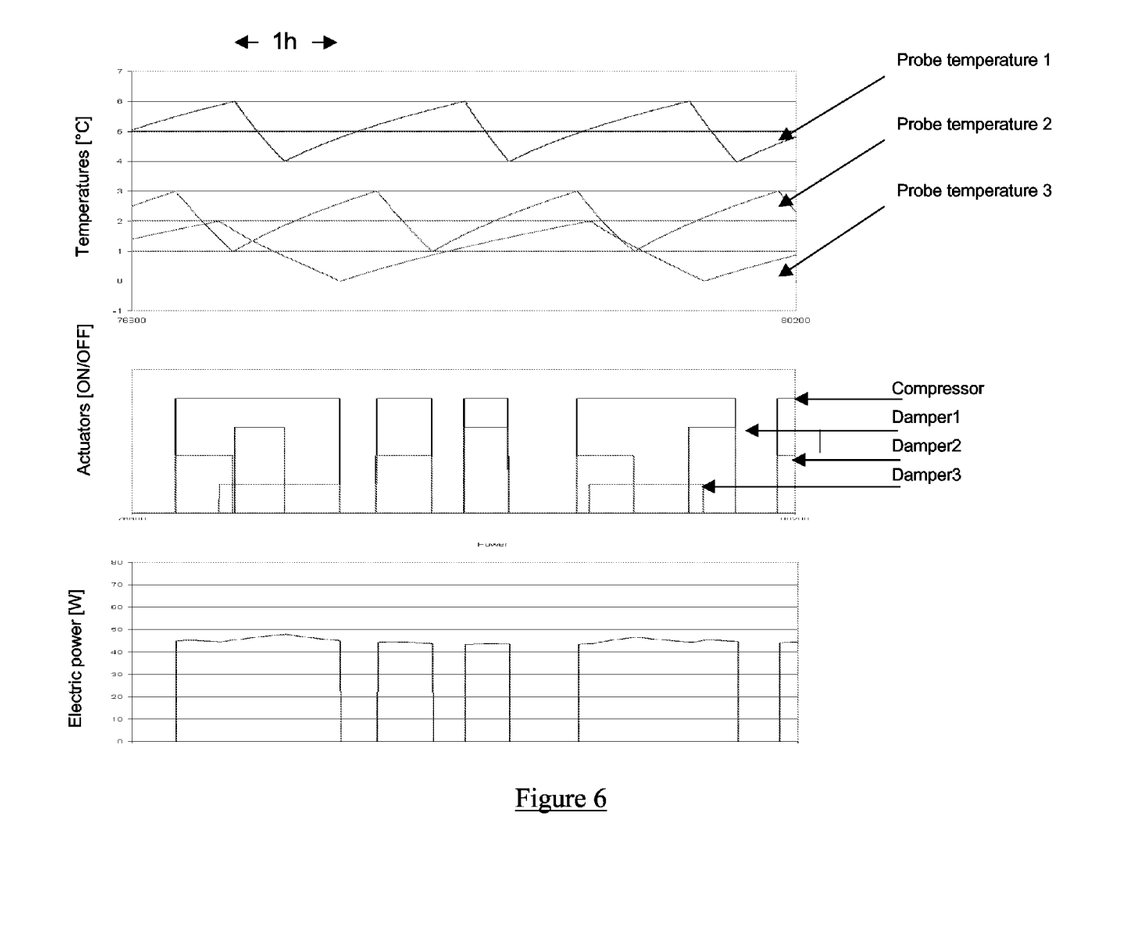
FIG. 6 shows three comparative diagrams showing the results when a traditional control system (without any synchronization) is applied to the refrigerator as shown in FIG. 1.

A comparison between FIGS. 5 and 6 highlights the advantages of the present invention. FIG. 5, in particular, shows the test results of a 3-compartment refrigerator (according to FIG. 1) controlled by the algorithm described in the present invention. In this case, the off-synchronization version was used (according to FIG. 3). FIG. 6 shows the same appliance controlled with a traditional method (the compressor is switched on when at least one compartment requires to be cooled according to the traditional criterion of hysteresis). By comparing the second diagram of FIG. 5 (status of the actuators) with the corresponding second diagram of FIG. 6, it can be noticed how the present invention minimizes the run time of the on-off compressor and, by consequence, how it minimizes the energy consumption. Such results are summarized in the following table:

|  | No Synchronisation (FIG. 7) | Synchronisation (FIG. 6) |
| --- | --- | --- |
| Average temperature comp. 1 | 5.1 [° C.] | 5.1 [° C.] |
| Average temperature comp. 2 | 2.1 [° C.] | 2.1 [° C.] |
| Average temperature comp. 3 | 1.1 [° C.] | 1.1 [° C.] |
| Compressor Run time (%) | 62% | 45% |
| Average Power | 28.3 [W] | 23.1 [W] |

The minimization of the energy consumption comes from the synchronization of the actuators (dampers and compressor). In fact the synchronization maximizes the cooling condition in which the compressor is ON and all the actuators are opened, that is the most efficient condition from the thermodynamics point of view, being the heat exchange between evaporator and compartment maximum in this condition.

It can be noticed that the minimization of the compressor run-time and (by consequence) of the energy consumption is obtained tanks to the synchronization provided by the present invention.

In the above description of one embodiment of the present invention we assumed that the time window length was constant. A second embodiment of the invention can consist in having this parameter variable and self-tunable by the control algorithm. This would render the entire control system self-adaptive in response to different sizes of the appliance and/or work conditions.

Figure 7:
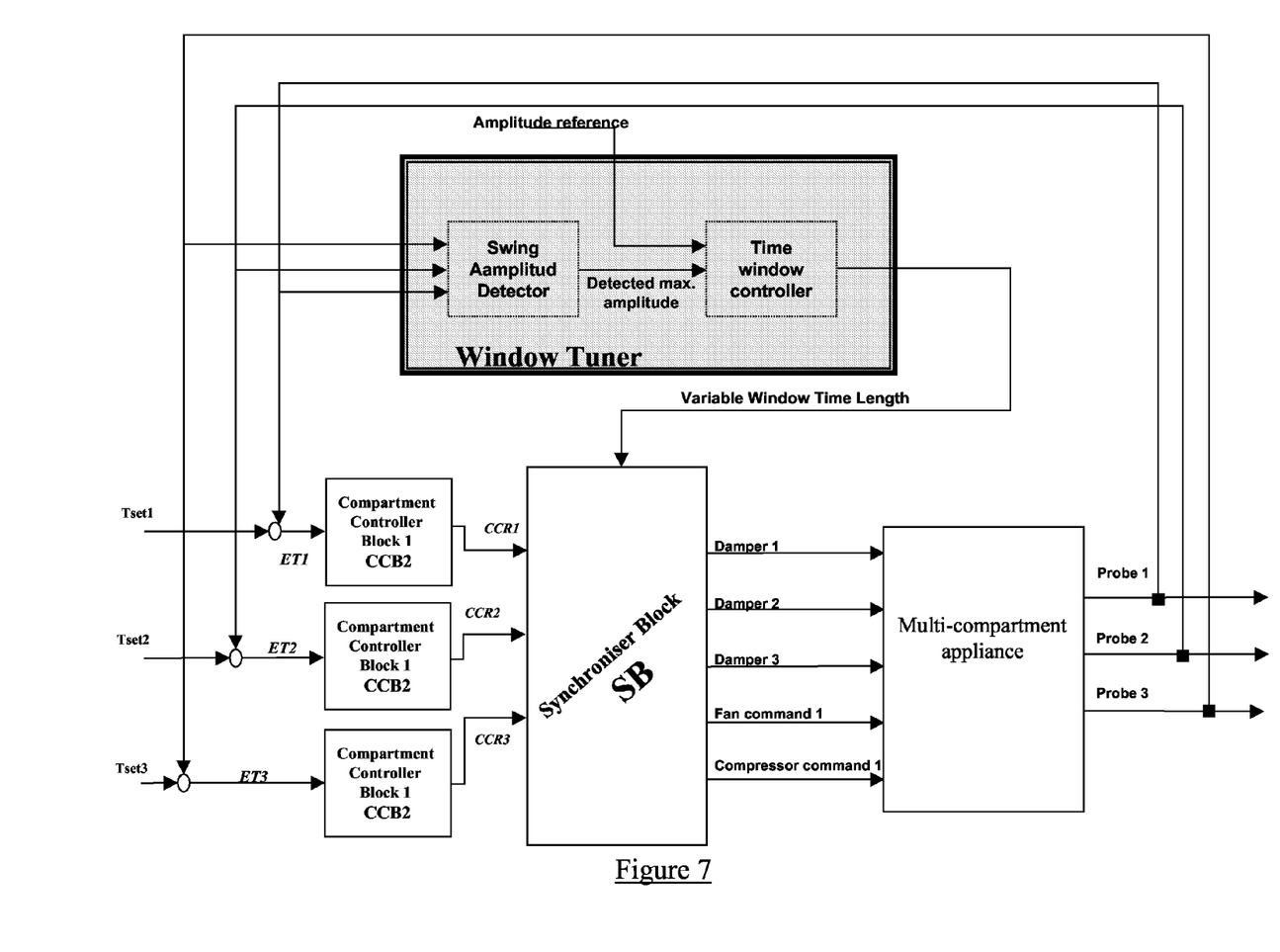
FIG. 7 is a block diagram representation of a second embodiment of a control algorithm according to the invention, associated to a multi-compartment refrigerator, in which the time interval length TW is automatically tuned.

A method to implement said adaptability of the time window length is shown in FIG. 7. This figure shows a block diagram of the control algorithm (similar to FIG. 2) with the addition of the time window tuner block. In particular, it computes the maximum swing temperature among the n-compartments (by means of the "swing amplitude detector" sub-block) and then it compares this amplitude with a reference amplitude value (determined for example during the design phase). The difference is then processed by the "time-window controller" sub-block that decides the correct window length. The time window controller can be designed according with the traditional control theory (i.e. it can be a PID controller), it can consist of a simple look-up table or it can be based on the application of advanced computational intelligence techniques such as fuzzy logic.

Figure 8:
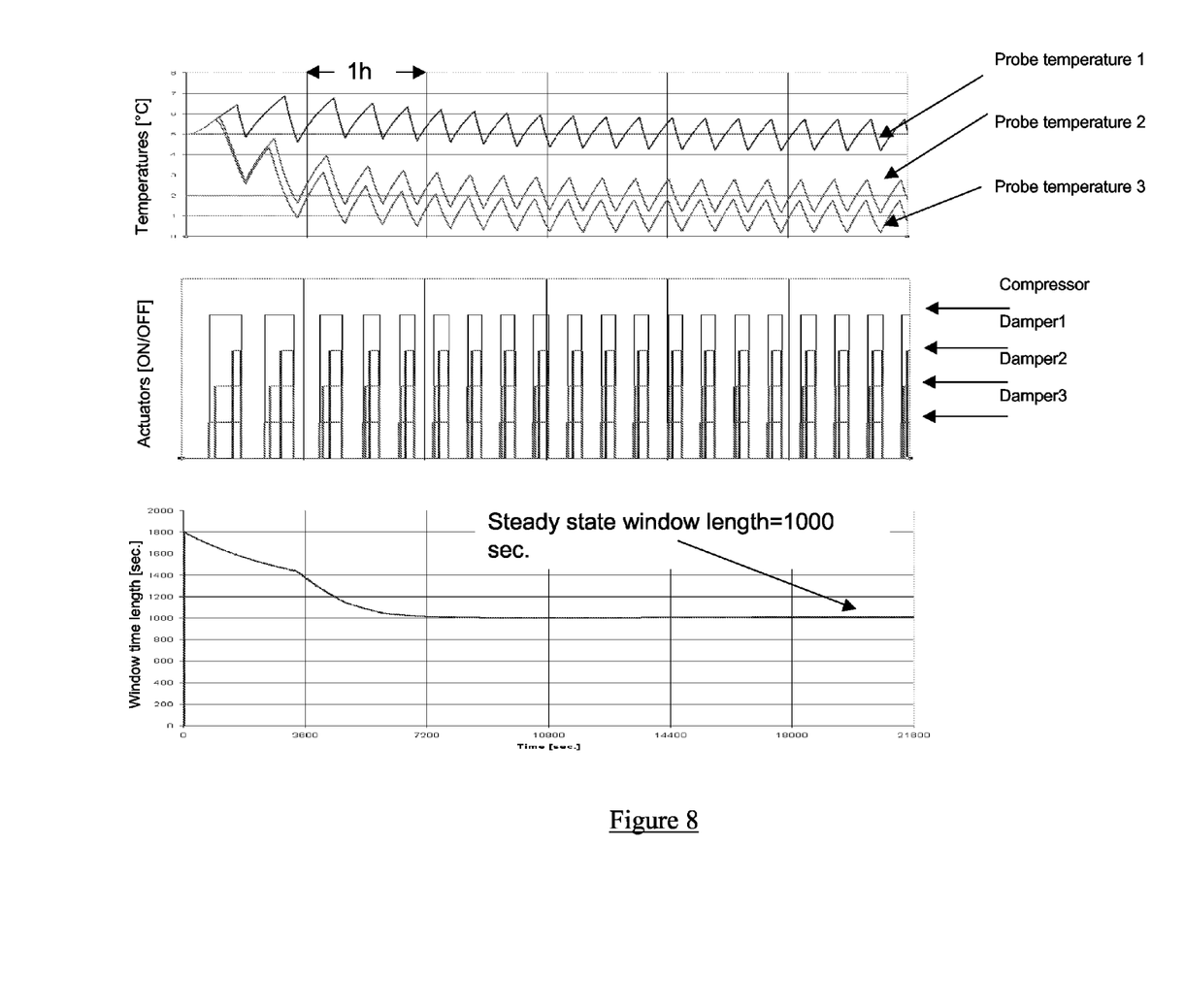
FIG. 8 shows three diagrams showing the results when the method according to the embodiment shown in FIG. 7 is carried out in a large size multi-compartment refrigerator.
Figure 9:
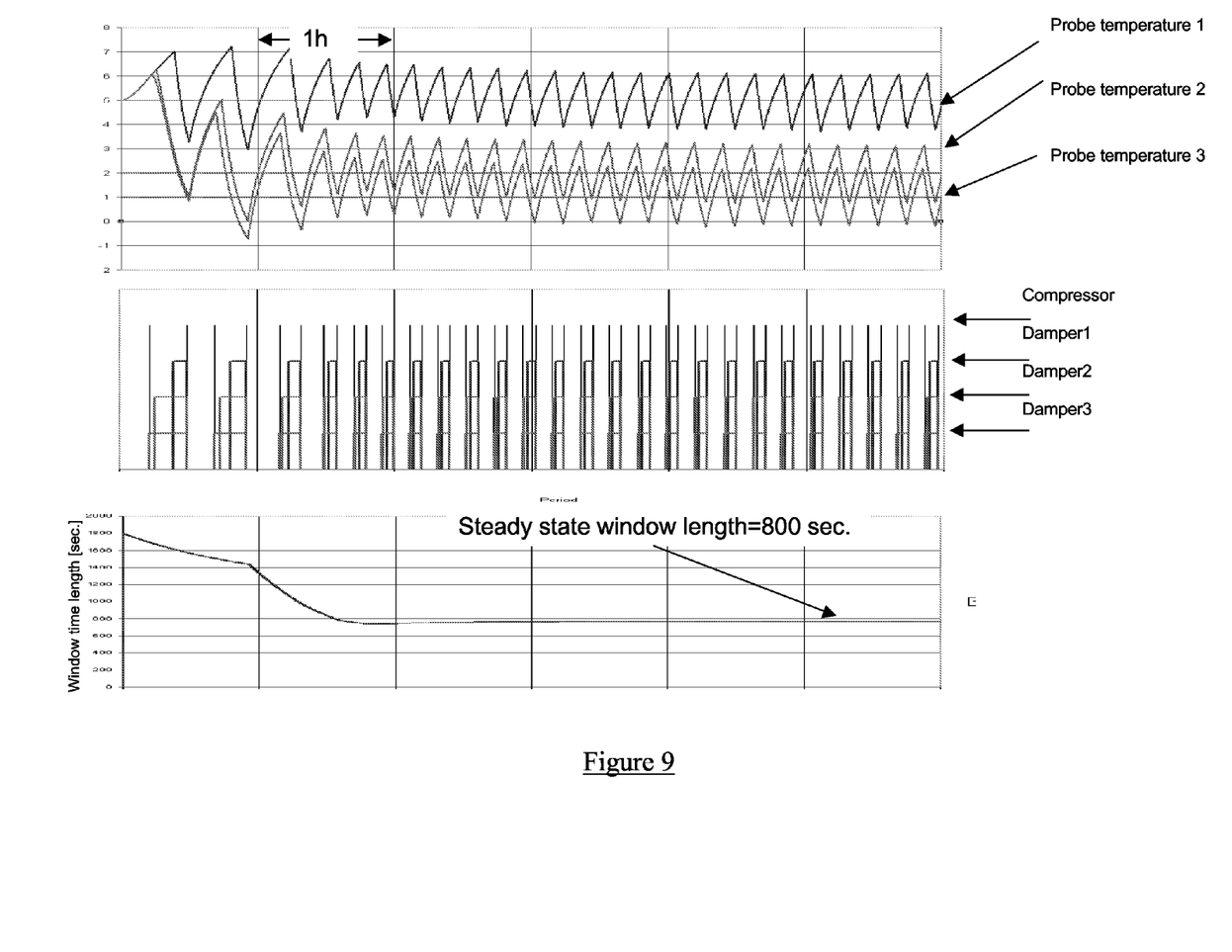
FIG. 9 shows three diagrams showing the results when the method according to the embodiment shown in FIG. 7 is carried out in a small size multi-compartment refrigerator.
Figure 10:
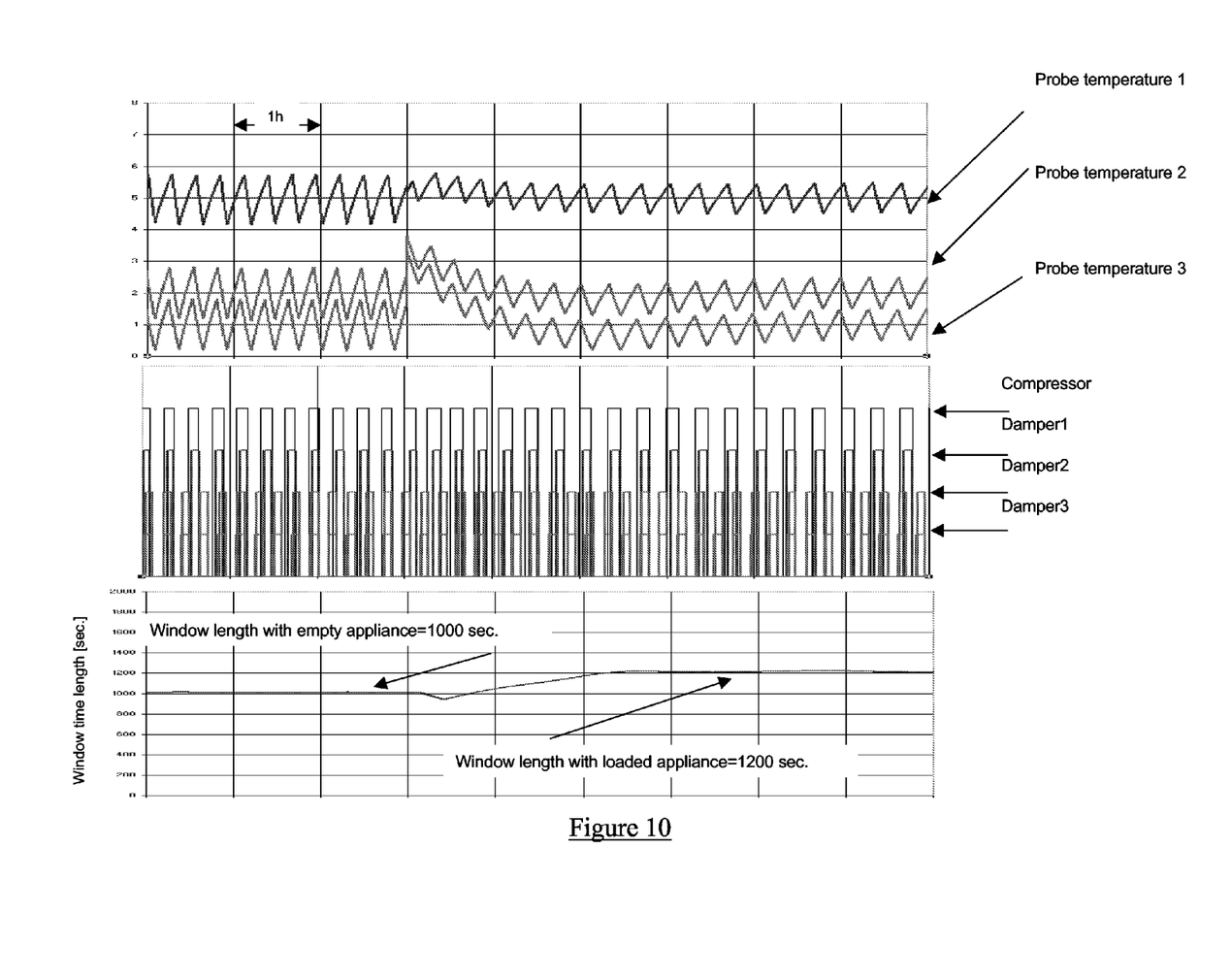
FIG. 10 shows three diagrams showing the results when the method according to the embodiment shown in FIG. 7 is carried out in response to load introduction.

FIGS. 8 and 9 show the capability of this kind of control to adapt itself (and in particular the time window length) to the size of the appliance. In particular FIG. 8 shows the behavior of the control when applied to a large size appliance of the type shown in FIG. 1. The time window controller automatically finds a window time length of 1000 s, in order to maintain the temperature swing amplitude under 2° C. FIG. 9 shows the same control applied to a small size appliance. In this case the window time controller automatically tunes the window time length on the value of 800 s (in order to keep the swing temperature amplitude under 2° C.). FIG. 10 shows the capabilities of the control of FIG. 7 to self adapt the window time length to the load conditions of the appliance. In particular in the first left part of the chart the appliance is empty and the time window controller sets the window time length on the value of 1000 s. After 4 hours all the compartments are loaded with food. The time window controller detects a change in the temperature dynamics and automatically sets the time window length on the value of 1200 s. Of course as the load changes the thermal capacity of the full system the new dynamics will remain fixed till new changes are set.

Figure 11:
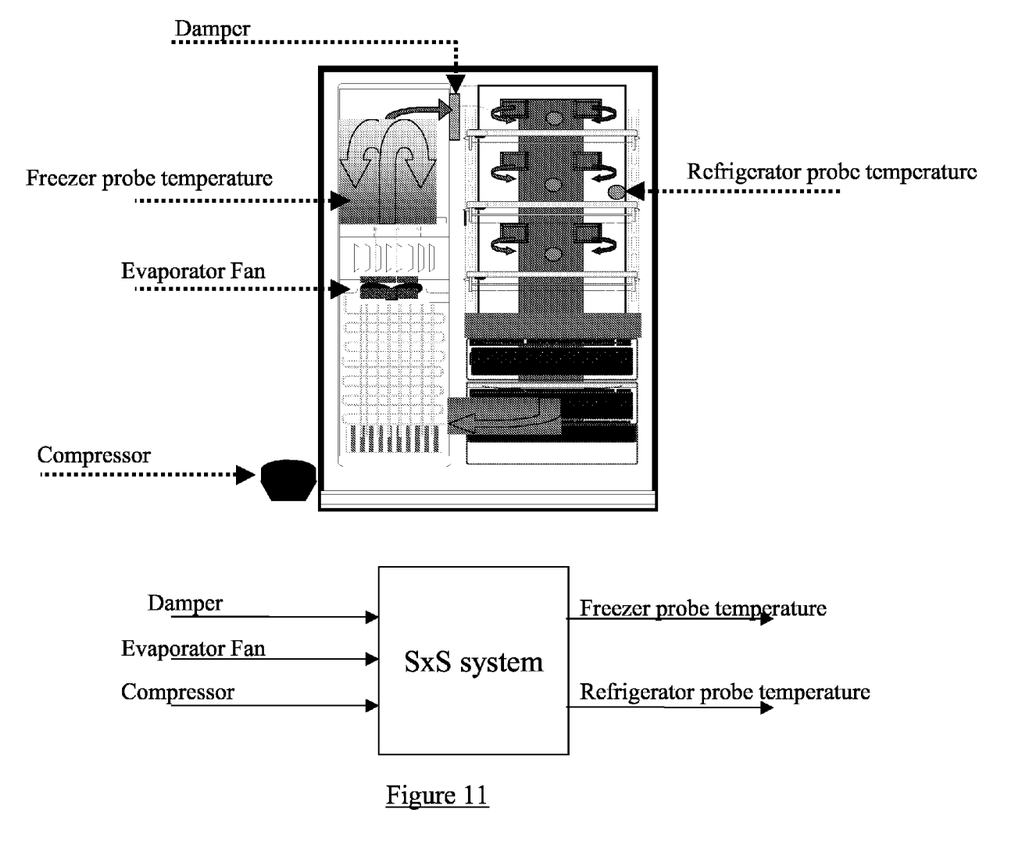
FIG. 11 is a schematic representation of a side by side refrigerator controlled according to the present invention.

The advantages of the present invention were presented by considering the refrigerator shown in FIG. 1. This has not to be considered as a limitation of the invention. In fact the present invention can be applied to any multi-compartment refrigerator (with at least 2 compartments) having a cooling system that allows synchronization between the compartments. For example, the invention can be applied to multi-compartment refrigerator where each compartment has a dedicated evaporator that can be disabled or enabled by the correspondent valve (in this case the compartment actuator CA is such valve). To prove that the present invention may be extended to any multi compartment refrigerator with a cooling system that allows a cooling synchronization, it was also applied to a traditional side by side refrigerator shown in FIG. 11. It is well known that such refrigerator comprises two compartments (freezer and fresh food compartment) each with its own door. Switching on the evaporator fan and the compressor cools the freezer. The fresh food compartment is cooled by switching on the evaporator fan and by opening the damper. The synchronization, in this case, consists on maximizing the cooling condition in which both the compartments are cooled simultaneously (compressor on, evaporator fan on and damper open), being this condition the most efficient from the thermodynamics point of view. The performances of the control are described in FIG. 12. It represents 3 hours of running, and the on-synchronization version was applied in this case (the damper, the fan and the compressor are switched on simultaneously at the beginning of each time window). The compressor is on until the freezer FZ cooling request is lower than the carrier signal, the damper is open until the fresh food compartment FR cooling request is lower than the carrier signal, the fan is on when the compressor is on or the damper is open.

Figure 12:
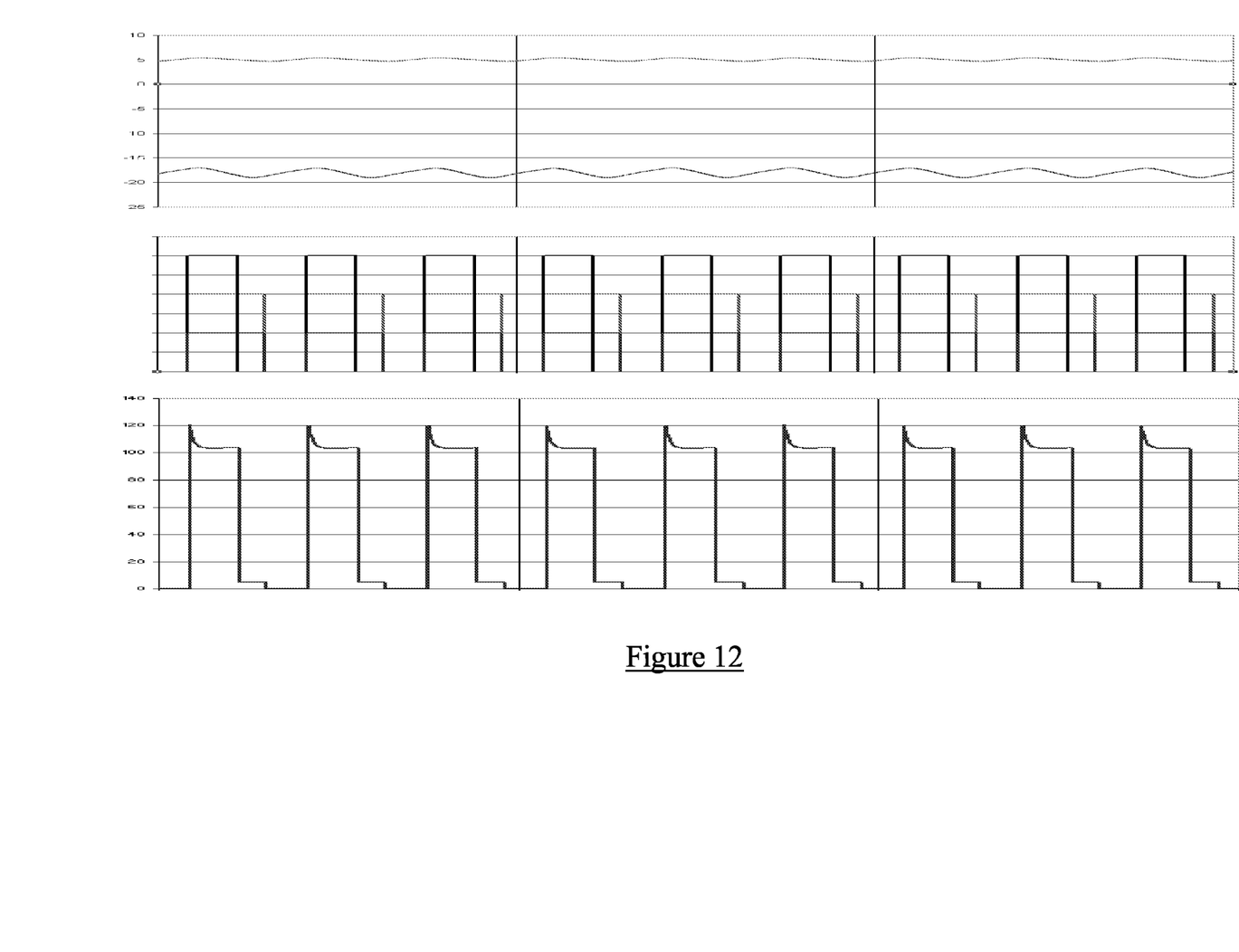
FIG. 12 shows test results obtained with an on-synchronization controller according to the invention, connected to the refrigerator of FIG. 11.
Figure 13:
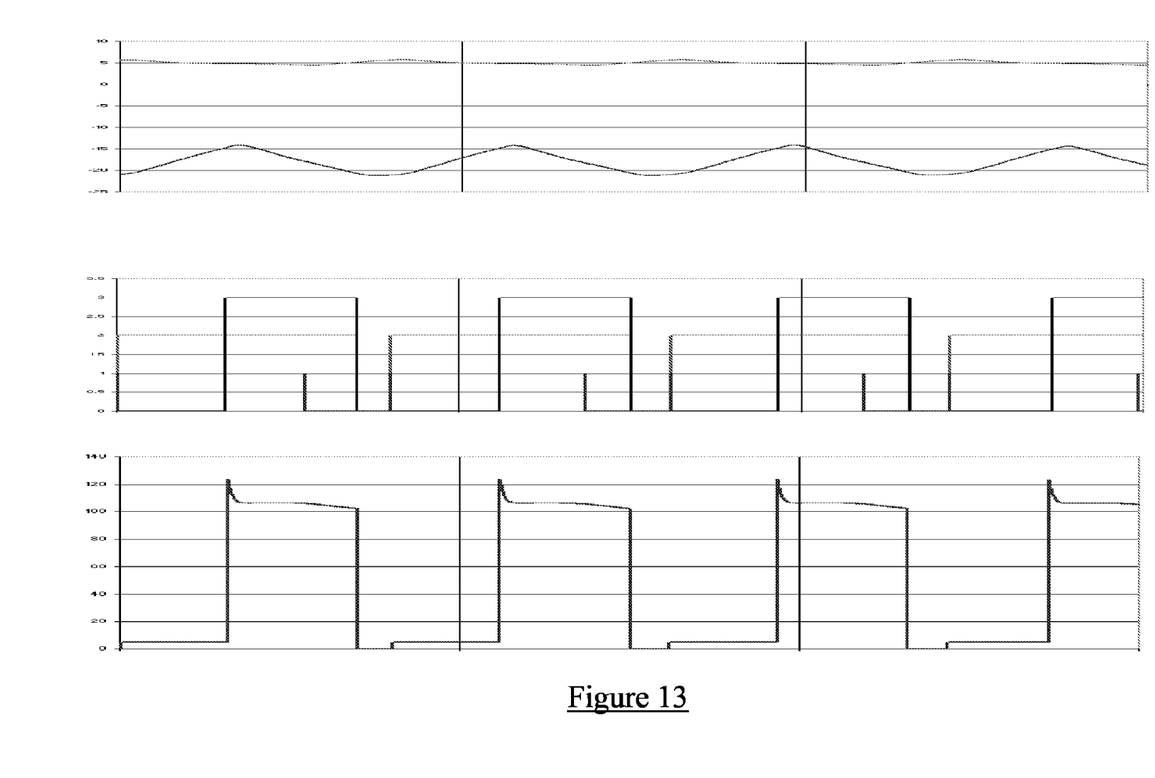
FIG. 13 shows comparative test results of a side by side refrigerator controlled with a traditional method (i.e. without any synchronization).

FIG. 13 shows the behavior of a traditional control applied to the same side by side refrigerator considered in FIG. 12. In this case the control opens the damper as the fresh food compartment asks to be cooled and it switches on the compressor as the freezer ask to be cooled. The request of the compartment is based on a traditional hysteresis algorithm and no synchronization is provided. The following table summarizes the comparison between the two working conditions considered in FIGS. 12 and 13. It can be noticed that the effect of the synchronization is a significant reduction of the energy consumption.

|  | No Synchronisation (FIG. 13) | Synchronisation (FIG. 12) |
| --- | --- | --- |
| Average temperature freezer [° C.] | −18° C. | −18° C. |
| Average temperature fresh food compartment [° C.] | 5.0 | 5.0 |
| Compressor Run time (%) | 48% | 41% |
| Average Power (W) | 53 | 44 |

Of course the algorithm applied to the above side by side refrigerator may be implemented on the basis of a off-synchronization, according to which the control system switches on the evaporator fan and opens the damper simultaneously when the temperature in the freezer is higher than the value of the carrier function.

The invention claimed is:

1. A method for controlling a refrigerator having at least two compartments and actuators for maintaining temperatures of the compartments close to predetermined set values, comprising:
   for each compartment, comparing a signal indicative of a cooling request and a signal variable of a carrier wave function with its minimum value at one of the beginning and ending of a predetermined time interval and its maximum value at the other of the beginning and ending of the predetermined time interval, and
   operating the actuators on the basis of the comparison.

2. The method according to claim 1 wherein the operating the actuators comprises at least one of activating and deactivating the actuators during the predetermined time interval.

3. The method according to claim 2 wherein the operating the actuators comprises activating and deactivating the actuators during the predetermined time interval.

4. The method according to claim 2, wherein the predetermined time interval is automatically adjusted on the basis of the refrigerator type and/or on the basis of the refrigerator load.

5. The method according to claim 4, wherein the adjustment of the time interval is carried out in order to maintain the temperature variation in each compartment within a minimum predetermined range.

6. The method according to claim 1 and further comprising repeating the comparing and operating steps for subsequent time intervals.

7. The method according to claim 1 wherein the actuators comprise at least one of compressor, fan, damper and valve.

8. The method according to claim 1, wherein the actuators comprise a compressor, an evaporator fan and dampers, and the compressor and the evaporator fan are switched on together when the first one of the dampers is opened.

9. The method according to claim 1, wherein the actuators comprise a compressor, an evaporator fan and dampers, and the compressor and the evaporator fan are switched off together when the last one of the dampers is closed.

10. The method according to claim 1, wherein the actuators comprise a variable cooling capacity compressor, variable speed fans, variable window dampers, and flow regulating valves, and the actuators assume values to form the "on" period to the "off" period from any of the intermediate values that the actuators can provide according to a determined control.

11. The method according to claim 1, wherein one of the compartments is a freezer compartment and another compartment is a fresh food compartment, and the actuators are a compressor, an evaporator fan and a damper between the freezer and the fresh food compartments and which control a flow of cold air form the freezer compartment to the fresh food compartment, wherein the evaporator fan is switched off and the damper is closed simultaneously.

12. The method according to claim 1, wherein one of the compartments is a freezer compartment and another compartment is a fresh food compartment, and the actuators are a compressor, an evaporator fan and a damper between the freezer and the fresh food compartments and which control a flow of cold air form the freezer compartment to the fresh food compartment, wherein the evaporator fan is switched on and the damper is opened simultaneously.

13. A refrigerator comprising:
a freezer compartment;
a fresh food compartment;
actuators comprising a compressor, evaporator fan, and a damper between the freezer and the fresh food compartment to allow a flow of cold air from the freezer to the fresh food compartment to maintain temperatures of the compartments close to predetermined set values; and
a control system operably coupled to at least some of the actuators to effect the maintaining of the temperatures by comparing a signal indicative of the cooling request of each compartment against a predetermined carrier function during a predetermined time interval, and, based on the comparison, at least one of: 1) switching on the evaporator fan and opening the damper when the temperature in the freezer is lower than the carrier function and 2) switching off the evaporator fan and closing the damper when the temperature in the freezer is higher than the carrier function.

14. The refrigerator according to claim 13, wherein the control system operates the actuators by activating and deactivating the actuators.

15. The refrigerator according to claim 13, wherein the control system simultaneously switches off the evaporator fan and closes the damper.

16. The refrigerator according to claim 13, wherein the control system simultaneously switches on the evaporator fan and opens the damper.

* * * * *